United States Patent [19]

Bowes

[11] 4,292,205

[45] Sep. 29, 1981

[54] ION EXCHANGE AND IMPREGNATION OF CATALYSTS

[75] Inventor: Emmerson Bowes, Pilesgrove Township, Salem County, N.J.

[73] Assignee: Mobil Oil Corporation, New York, N.Y.

[21] Appl. No.: 59,349

[22] Filed: Jul. 20, 1979

[51] Int. Cl.$^3$ .......................... B01J 29/06; B01J 29/28
[52] U.S. Cl. .................................. 252/455 Z; 423/118
[58] Field of Search ................ 252/455 Z; 423/24, 54, 423/63, 70, 100, 112, 139, 181

[56] References Cited

U.S. PATENT DOCUMENTS

| | | | |
|---|---|---|---|
| 1,385,124 | 7/1921 | Foster | 423/112 |
| 2,987,465 | 6/1961 | Johanson | 208/10 |
| 3,537,816 | 11/1970 | Moscou et al. | 423/112 |
| 4,023,964 | 5/1977 | DeMathe | 423/24 X |
| 4,048,284 | 9/1977 | Horton et al. | 423/112 |
| 4,137,290 | 1/1979 | Degenkolb et al. | 423/24 X |

*Primary Examiner*—Carl F. Dees
*Attorney, Agent, or Firm*—C. A. Huggett; C. J. Speciale; G. W. Allen

[57] ABSTRACT

An improved process for impregnation or ion exchange of catalysts or catalyst supports utilizing ebullated bed techniques.

11 Claims, No Drawings

ION EXCHANGE AND IMPREGNATION OF CATALYSTS

BACKGROUND OF THE INVENTION

1. Field of the Invention

This invention relates to an improved method for the ion exchanging and impregnating of catalysts and catalyst supports. More particularly, this invention relates to an ebullated bed technique for the ion exchange and impregnation of catalysts.

2. Description of the Prior Art

Heterogeneous catalysts are essential processing aids in the chemical process industries because of the enormous value they add to feedstock material. They are used in a wide variety of chemical process applications. In addition to their well-known uses in the refining industry, catalysts play a wide role in chemical petrochemical operations.

Heterogeneous catalysts are produced in a variety of physical forms and sizes, ranging from the micron size used in fluidized-bed operations to particles as large as one-half inch, which may be in the form of beads, extruded pellets, tablets or granules. The size and shape of the catalyst is dictated by the process in which it will be utilized.

J. Y. Livingston, *Hydrotreating Catalyst Properties Do Affect Performance*, AICHE Meeting, Mar. 12, 1973, Paper 9B, classifies the manufacturing of catalysts into three general approaches:

Precipitation or Coprecipitation
Impregnation (including Ion Exchange)
Comixing or Compounding A precipitated or coprecipitated catalyst is derived from a solution. An impregnated catalyst is one in which a previously formed support is coated with or dipped in a solution of another metal or metals. A comixed or compounded catalyst is one in which all the ingredients are mechanically mixed together before the catalyst is formed into its final shape.

The manufacturing steps for all three of the above approaches are similar, however, there are differences in the order in which each of the steps is conducted. Catalyst production generally involves the unit operations of dissolving, precipitation, filtration, centrifugation, drying, impregnation, calcination, ion exchange and crystallization.

A great number of solid catalysts are produced by extending the desired catalytic material through the pores or over the surface of a carrier by means of impregnation. This not only secures the catalytic material, but puts it in a form readily handled, or exposes a greater surface for maximum utilization and efficiency.

The general steps in the impregnation approach include precipitation of a support followed by washing and drying, forming of the support, activation of the support, impregnation from metallic solutions, drying, washing or decomposing and final activation. Final activation of the catalyst is usually accomplished by thermal means at temperatures in the range of 600° F. to 1600° F. Thermal treatment in air results in a catalyst with the highest possible surface area for the material being processed.

Impregnation and ion exchange of catalysts and catalyst supports is broadly old. Typical impregnation procedures which include the dipping or soaking technique and the spraying technique are described in the following articles, all of which are incorporated herein by reference: W. D. Stillwell, *Preformed Catalysts and Techniques of Tableting*, INDUSTRIAL AND ENGINEERING CHEMISTRY, Vol. 49, No. 2, Feb. 1957, p. 245; G. W. Higginson, *Making Catalysts—An Overview*, CHEMICAL ENGINEERING, Sept. 30, 1974, p. 98; and F. Traina and N. Pernicone, *Preparation Techniques and their Influence on the Properties of the Solid Catalysts* LA CHIMICA E L'INDUSTRIA, Vol. 52, N.1, Gennaio 1970, p. 1.

There are two basic approaches to impregnation and ion exchange. The more obvious approach is the "dipping" or "soaking" technique in which the preformed substrate is immersed in a solution of the impregnating salt. Controlled variables are soak time, temperature and solution pH. Since the substrate usually has a given capacity to absorb solution within its pore structure, the solution concentration determines the amount of metal salt absorbed in the substrate. A drainage period follows, then drying and a salt decomposition step in arriving at the finished catalyst. The ability to control the final metal concentration in the dipping technique is less certain than in the spraying technique.

The dipping or soaking of preformed shapes is usually carried out in baskets which are dipped into the impregnating/ion exchange solution. Tough granular supports and coarse powders are usually handled by a dragline or spiral conveyor moving through a dip tank. Each dipping is usually followed by draining, drying and calcining to complete the cycle. Another technique for dipping or soaking involves pumping a solution of material to be impregnated or ion exchanged through a packed column of catalyst carrier. The concept of the present invention deals with this particular technique.

Batch process impregnation can be used for granules (beads, extruded pellets, etc.). The impregnation is achieved in a medium-sized barrel of a few cubic meters, wherein the useful volume is about one cubic meter. The unit load can range from about 500 kg to 2 tons according to the apparent density of the support. The barrel, whose inner surface is fitted with blades having an appropriate shape, can turn on its rollers in both ways—one way for filling and impregnation time (from a few minutes to one hour) and the other way for emptying (a few minutes). The impregnating solution is also prepared in batch.

The other main approach to impregnation exchange is the "spraying" technique. In this technique, the catalyst carrier is evacuated and over it is sprayed, while conveniently stirred, a volume of solution of active components not higher than the carrier's absorptive capacity. In lieu of stirring, the catalyst can be contained in a vessel which is designed to rotate during spraying. The vessel can be equipped with a heated shell to carry out catalyst drying. After spraying and drying, the catalyst is calcined.

The vessel utilized for a continuous spraying process would be smaller than the vessel used if a batch process impregnation was employed. A typical vessel size for a continuous spraying process is from about a few hundred liters to about one cubic meter. The preparation of the impregnating solution is achieved continuously by means of a metering pump. The solution flowrate is adjusted to the feedrate of the support. Continuous spraying processes allow for high production rates.

The impregnating of fine powders (alumina, silica-magnesia) is achieved in a horizontal double-screwed mixer. The fine powder is impregnated by means of a water distributor fitted with holes whose diameter is adjusted by means of diaphragms.

The spraying technique is usually preferred over the conventional soaking or dipping technique since the spraying technique usually results in a more uniformly impregnated/ion exchanged catalyst. Also in the spraying technique, there is a more accurate control of the metal concentration. When dealing with expensive metals, the cost of catalyst production can be drastically reduced by the judicious control of metals.

Heretofore conventional impregnation and ion exchange techniques sometimes resulted in non-uniform distribution of impregnation/ion exchange solution on the catalyst carrier. Also said conventional techniques have been known to unduly damage catalysts due to the various stirring and mixing operations employed. It would thus be very advantageous to have a process for uniformly impregnating and ion exchanging catalysts without undue catalyst damage.

Ion exchange of crystalline zeolites is disclosed in numerous patents such as U.S. Pat. Nos. 3,140,249; 3,140,251; 3,140,253; and 4,083,807. Such ion exchange is generally accomplished by contacting the zeolite with a solution of a salt, the cation of which it is desired to replace for the alkali metal in the crystalline zeolite. Generally speaking, multiple exchanges have been used to reduce the alkali metal content to a level wherein the residual exchangeable alkali metal is such that it does not adversely affect catalysis. Some methods have heretofore been proposed which embody a calcination step between multiple exchanges. U.S. Pat. Nos. 3,402,996 and 3,677,698 disclose such multiple ion exchange processes.

An improved process for ion exchange treatment of zeolitic FCC catalysts using moving sectionalized vacuum belt fitters operated to include flooded percolation zones and in which ion exchange treatment takes place with a countercurrently flowing ion exchange liquid is disclosed in U.S. Pat. No. 4,048,284.

Impregnation of crystalline zeolites is disclosed in numerous patents such as U.S. Pat. Nos. 3,965,208; 4,002,698 and 4,034,053. Impregnation is generally accomplished by contacting a zeolite with a solution containing the material to be impregnated. The mixture of the zeolite carrier and said solution is stirred. The solids are then filtered out, washed, dried and then calcined.

Ebullated bed technology is well described in U.S. Pat. No. 2,987,465 and the ebullated bed technique has been used in the past in various hydrogenation and hydrotreating processes and such uses are disclosed in U.S. Pat. Nos. 3,183,178; 3,183,180; 3,418,234; 3,705,850; 3,761,393; 3,948,756. The application of ebullated bed techniques to catalyst impregnation and ion exchange is novel.

SUMMARY OF THE INVENTION

There has now been discovered an improved process for the ion exchanging and impregnating of catalysts and catalyst supports utilizing an ebullated bed technique. The improved process of the present invention is particularly useful when conventional methods yield a non-uniform distribution of ions or other material being impregnated or ion exchanged onto the catalyst carrier.

In the simplest terms, this invention involves providing means of bubbling air into a catalyst bed to create an ebullated bed during the impregnation or ion exchange process. The ebullated bed promotes uniform distribution of the material being impregnated or ion exchanged without undue damage to the catalyst.

DESCRIPTION OF THE SPECIFIC EMBODIMENTS

Materials which can be impregnated or ion exchanged and therefore useful in this invention comprise active and inactive substances and synthetic, naturally occurring, or semi-synthetic substances. The substances may be crystalline or amorphous, as well as zeolitic or non-zeolitic. The useful materials comprise clays, refractory inorganic metal oxides and infusorial earths.

Naturally occurring clays useful in this invention include the montmorillonite and kaolin families, which families include the sub-bentonites and kaolins commonly know as Dixie, McNamee, Georgia and Florida clays or others in which the main constituent is halloysite, kaolinite, dickite, nacrite or anauxite. Such clays can be used in the raw state as originally mined or initially subjected to calcination, acid treatment or chemical modification.

The refractory inorganic metal oxide material may comprise alumina, silica, beryllia, zirconia, magnesia, titania, boria, strontia, thoria, hafnia and mixtures of two or more including silica-alumina, silica-zirconia, silica-thoria, silica-beryllia, silica-magnesia, silica-titania, alumina-zirconia, alumina-magnesia, alumina-titania, magnesia-zirconia, titania-zirconia, magnesia-titania, silica-alumina-zirconia, silica-alumina-magnesia, silica-alumina-titania, silica-magnesia-zirconia, alumina-silica-magnesia-titania, etc. The refractory inorganic metal oxide material may be formed by any of the numerous techniques which are well defined in the art.

Non-limiting examples of zeoitic materials useful in this invention include the synthetic zeolites X, Y, ZSM-5, ZSM-11, ZSM-12, ZSM-23, ZSM-35, ZSM-38 and others, and naturally occurring zeolites, such as erionite, faujasite, mordenite, levynite, dachiarite, analcite, paulingite, noselite, phillipsite, chabazite, leucite, ferrierite and others.

Non-limiting examples of infusiorial earths include kieselguhr, diatomite, tripolite, diatomaceous earth, ceysasite, fossil flour, terra silicea, siliceous earth and others.

Almost any element of the periodic table is a potential element for impregnating or ion exchanging onto the aforementioned materials. The most widely used elements include the metals of Group VI, VII and VIII, particularly chromium, molybdenum, nickel, iron, cobalt, platinum, tungsten and palladium; also Group I metals such as copper, silver, zinc and mercury are used. Coupled with these elements, such components as stabilizers, promoters, or activators, may be introduced.

This invention is applicable to most catalyst shapes and sizes. Thus catalysts in the form of granules, beads, pellets, spheres, cylinders (extrudates) hollow cylinders, coarse powders and tablets can be used herein. Catalysts ranging in diameter size from about ½ inch to about 500 microns and preferably from about 1/32 inch to about 500 microns could be processed in this invention.

Impregnations can be made from molten salts. Effective impregnating salts may be amines, nitrates, or any other water soluble form which readily decomposes to the desired oxide without by-product impurities. Pressure methods can be used, however, the most widely used system is impregnation from aqueous media at normal atmospheric pressure.

Impregnation of a catalyst carrier depends on the amount of impregnated material desired, the solubility of the impregnating material, the porosity of the carrier and the degree of penetration to be effected.

The pickup of metal salt solution can vary considerably with the nature of the catalyst mount. It is not always possible to obtain a desired maximum metal content with only one impregnation and sometimes it is necessary to employ multiple impregnations. This introduces added calcinations between each impregnation and subsequently increases the cost of the finished catalyst.

When adsorption of one or more of the impregnating salts occurs on the catalyst, none of conventional methods disclosed herein is satisfactory without refinement since inter and intra particle distribution of the impregnant becomes non-uniform. This is especially aggravated where dust occurs on the catalyst surface, as in fresh calcined alumina, and is particularly serious when depositing expensive metals such as Pt, Pd and Iron the surface of catalyst particles. The use of viscous impregnating solutions also leads to non-uniform impregnation.

Another problem encountered in using the conventional ion exchange/impregnation techniques is damage to catalysts. The use of stirred and rotating reactors in impregnation processes leads to catalyst attrition.

The process of the present invention alleviates these problems associated with conventional impregnation and ion exchange approaches. By the use of an ebullated bed technique, catalysts can be uniformly impregnated or ion exchanged with little or no attrition or damage to the catalysts.

Whereas one method of impregnation/ion exchange of solid catalyst carrier particles involves contacting a vertical packed vessel of said catalyst particles with an upflowing stream of impregnating/ion exchanging liquid solution, the improvement of this invention resides in the introduction of a gas stream cocurrently with said liquid stream in order to promote an ebullated bed. The cocurrently flowing gas and liquid streams upwardly through the bed of said solids under conditions to establish a random motion of the solid particles in the liquid without carrying the solids out of the vessel. A mass of solid particles in this state of random motion in a liquid medium may be described as "ebullated".

An ebullated mass of solid particles has a gross volume that is larger than that of the same mass when it is stationary. Based on the particular properties of the solid, liquid and gas utilized, the mass of solids is expanded from about a 10% greater volume than the settled state of the mass to as much as three times the settled volume. Preferably the expansion should be from about 10% to about 25% at the settled state of the mass.

It is a fairly simple matter to ascertain for any ebullated bed process the range of throughput rates of upflowing liquid and gas which will cause the mass of solid particles to become expanded while the particles are maintained in motion. The goal in an ebullated bed process is to have an expansion of the gross volume of the mass of solids without any substantial quantity of solid particles being carried away (entrained) by the upflowing liquid. If this goal is achieved then a fairly well-defined upper level of randomly moving particles will establish itself in the upflowing liquid. This upper level above which few, if any, particles ascend will hereinafter be called the "upper level of ebullation." In contrast to processes in which fluid streams flow downwardly or upwardly through a fixed mass of particles, the spaces between the particles of an ebullated bed are large with the result that the pressure drop of the liquid flowing through the ebullated mass is small and remains substantially constant as the fluid throughput rate is increased. Thus, a considerably smaller consumption of power is required for an ebullated bed than for a fixed bed, for a given throughput rate. Moreover, the ebullated mass of particles promotes effective and gentle mixing since the solid particles are cushioned in the liquid. It should be noted that in an ebullated bed, there is a sharp and finite level of the solids.

To obtain the advantages of this invention it is necessary only that the liquid and gas flow upwardly through the mass of solids at such a rate causing said mass to reach an ebullated state. In each ebullated system, variables which may be adjusted to achieve the desired degree of ebullation include flow rate, density and viscosity of the liquid and the gas, and the size, shape and density of the solid particles. It is a relatively simple matter to operate any particular process so as to cause the mass of solids to become ebullated and to calculate the percent expansion of the ebullated mass after observing its upper level of ebullation through a glass window in the vessel or by other means such as the taking of liquid samples drawn from the vessel at various levels.

Generally the process conditions of temperature and pressure in any particular system operated in accordance with this invention may be similar to the conditions when the system is operating without ebullation. The gas employed for ebullation can be any gas which is inert to the solids and liquid of the system. Such gases may include air, nitrogen, carbon dioxide, etc. The process of this invention can be operated either for batchwise or for continuous processing.

In a particular embodiment of this invention, an ebullated bed technique can be employed with a conventional packed tower soaking process. In such a conventional system, solid catalyst carrier materials are contained in a vertical packed tower. Introduced into the tower is preheated gases, usually air and/or nitrogen, which is used for calcination and drying. Also introduced into the tower can be various ion exchanging/impregnating solids which are pumped from nearby vessels.

Employing the packed tower soaking process for the impregnation of, for example, a zeolite catalyst involves a number of steps. Not including various washing and drying steps and starting with the zeolite in the sodium form (sodium tetrapropylammonium form), the zeolite is calcined with preheated nitrogen to remove organics. After calcining, it is exchanged with ammonium nitrate ions and then calcined in air. At this point the zeolite is in the acid (hydrogen) form. An impregnating solution is then pumped into the packed tower cocurrently with an inert gas stream. The flowrate of said gas is adjusted to form an ebullated bed in the tower. The impregnated catalyst is then dried, calcined and cooled. The following examples will illustrate the invention without limiting same.

EXAMPLES 1 to 10

The following ten examples involve the impregnation of ZSM-5 alumina extrudate having a bulk density of about 0.6 g/cc with a viscous solution of magnesium acetate to prepare Mg-P-ZSM-5, which is a useful catalyst in organic syntheses. In attempting to carry out this impregnation using conventional techniques, the acetate was taken up non-uniformly when the solution was pumped through a column of the ZSM-5 alumina extrudate.

In carrying out these examples, a 1¼ in. diameter glass fluid bed unit with an overall length of 2½ ft. was adapted to ebullated flow by supporting the catalyst bed some 1½" above the installed glass frit distributor plate through which air flowed. Between the fritted distributed plate and the bed of extrudate, the magnesium acetate solution of the desired concentration was introduced through the side of the unit and into an inert support.

The results of Examples 1 to 10 is given by Table 1. In these examples, a range of air flows and liquid flows were investigated to establish the region in which catalyst circulation was induced.

Example 1 shows the bed height without any flow of either liquid or air.

In Example 2, there is liquid flow, but no air flow. This Example illustrates the conventional impregnation technique without an ebullated bed.

For Examples 3 to 10, there is both liquid flow and air flow.

It was found that bed expansion occurred with magnesium acetate of 1.5 g. salt/g $H_2O$ (visc. KVA 40° C., 21.9) alone, which increased with flow rate. Introduction of air flow caused a contraction of the bed, a phenomenon that has been observed occasionally in some ebullated beds and first reported by Turner, *Fluidization in the Petroleum Industry,* SOC. CHEM. IND., Vol. 42, p. 47, 1963, and provides another advantage where the high viscosity of useful magnesium solutions could otherwise limit vessel loading or cause carryover of catalyst.

In Example 8, at a liquid flow rate (calculated on an empty vessel) of 0.21 ft/min. and gas flow of 0.41 ft/min., catalyst was observed by means of colored catalyst particles to flow down the walls at 0.33 ft/min. Inside the catalyst column, catalyst rose from the bottom to the surface and circulated in this fashion with some particles recycling by slippage into the center of the column.

The superficial velocities are on the low side of those reported for ebullated beds for liquids in this viscosity range. The bubbles were well dispersed but agglomerated in the inert support to produce slug bubbles in the system travelling essentially up the center of the catalyst column.

Although good dispersion is usually required in ebullated beds where the goal is contacting gas, liquid and solid, it is not required for this invention where the main objective is to provide good mixing. Channeling of the liquid together with a mixing of the bed is desirable for this invention.

The term "catalyst descent rate", as used in Table 1, is a measure of vertical mixing in an ebullated bed.

The system represented by Examples 1 to 10 would be carried out with a linear gas velocity of about 0.1 to about 0.5 ft/sec. and a liquid velocity of about 0.01 to about 0.20 ft/sec. The preferred range of operability of this system is exemplified by Examples 7, 8 and 9 wherein the bed expansion is about 20%.

TABLE 1

| Example No. | Liquid Flow | | | Air Flow | | |
|---|---|---|---|---|---|---|
| | Volume cc/min | Linear Velocity[1] cc/min | ft/min | Volume cc/min | Linear Velocity cc/min | ft/min |
| 1 | 0 | 0 | 0 | 0 | 0 | 0 |
| 2 | 15 | 1.9 | 0.066 | 0 | 0 | 0 |
| 3 | 27.7 | 3.5 | 0.011 | 27 | 3.4 | 0.11 |
| 4 | 27.7 | 3.5 | 0.011 | 38 | 4.8 | 0.16 |
| 5 | 27.7 | 3.5 | 0.011 | 75 | 9.5 | 0.31 |
| 6 | 27.7 | 3.5 | 0.011 | 100 | 12.6 | 0.41 |
| 7 | 40 | 5.1 | 0.17 | 100 | 12.6 | 0.41 |
| 8 | 51 | 6.4 | 0.21 | 100 | 12.6 | 0.41 |
| 9 | 51 | 6.4 | 0.21 | 133 | 16.8 | 0.55 |
| 10 | 51 | 6.4 | 0.21 | 5 | 0.6 | 0.02 |

| Example No. | Bed Height cm | Catalyst Descent Rate[2] | | Bed Expansion % |
|---|---|---|---|---|
| | | cm/min | ft/min | |
| 1 | 24.0 | 0 | 0 | — |
| 2 | 25.8 | 0 | 0 | 7.5 |
| 3 | — | | perceptible | — |
| 4 | 27.5 | 2.0 | 0.066 | 14.6 |
| 5 | 26.7 | 2.6 | 0.085 | 11.3 |
| 6 | 26.4 | 3.0 | 0.096 | 10.0 |
| 7 | 28.7 | 5.5 | 0.18 | 19.6 |
| 8 | 29.6 | 10 | 0.33 | 23.3 |
| 9 | 29.1 | 10 | 0.33 | 21.3 |
| 10 | 32.5 | 0 | 0 | 35.4 |

[1]Calculated on empty vessel basis
[2]At walls

What is claimed is:

1. An improved process for the continuous or batchwise impregnation or ion exchange of a catalyst or catalyst support of the type in which a settled mass of solid catalyst carrier particles is packed in a vessel and contacted with an upflowing stream of impregnating-/ion exchanging liquid solution, wherein the improvement comprises the introduction of a gas stream cocurrently with said liquid stream under conditions to establish an ebullated bed.

2. The process of claim 1 wherein the gas is selected from a group consisting of air nitrogen, carbon dioxide and mixtures thereof.

3. The process of claim 2 wherein the gas is air.

4. The process of claim 1 wherein the process is impregnation.

5. The process of claim 1 wherein the catalyst is ZSM-5 alumina extrudate.

6. The process of claim 1 wherein the liquid solution is magnesium acetate.

7. The process of claim 1 wherein the settled mass of solid catalyst carrier particles is expanded from between about 10% and about 25%.

8. A process for the preparation of a magnesium impregnated ZSM-5 catalyst which process comprises contacting a settled mass of solid particles of ZSM-5 alumina extrudate packed in a vessel with an upward flow of liquid magnesium acetate solution and a cocurrent upward flow of gas under conditions to transform said settled mass of solids into an ebullated bed.

9. The process of claim 8 wherein the settled mass of solid particles is expanded from between about 10% and about 25%.

10. The process of claim 8 wherein the gas is selected from a group consisting of air, nitrogen, carbon dioxide and mixtures thereof.

11. The process of claim 10 wherein the gas is air.

* * * * *

UNITED STATES PATENT AND TRADEMARK OFFICE
CERTIFICATE OF CORRECTION

PATENT NO. : 4,292,205

DATED : September 29, 1981

INVENTOR(S) : Emmerson Bowes

It is certified that error appears in the above—identified patent and that said Letters Patent is hereby corrected as shown below:

Column 1, line 18   After "chemical" insert --and--

Column 5, line 13   "When" should read --Where--

Column 5, line 41   After "streams" insert --pass--

Column 6, line 46   "solids" should read --solutions--

Signed and Sealed this

Fifteenth Day of December 1981

[SEAL]

Attest:

Attesting Officer

GERALD J. MOSSINGHOFF

Commissioner of Patents and Trademarks